Nov. 27, 1956 S. ELLIS 2,772,078
BEATER BLADES
Filed March 9, 1954
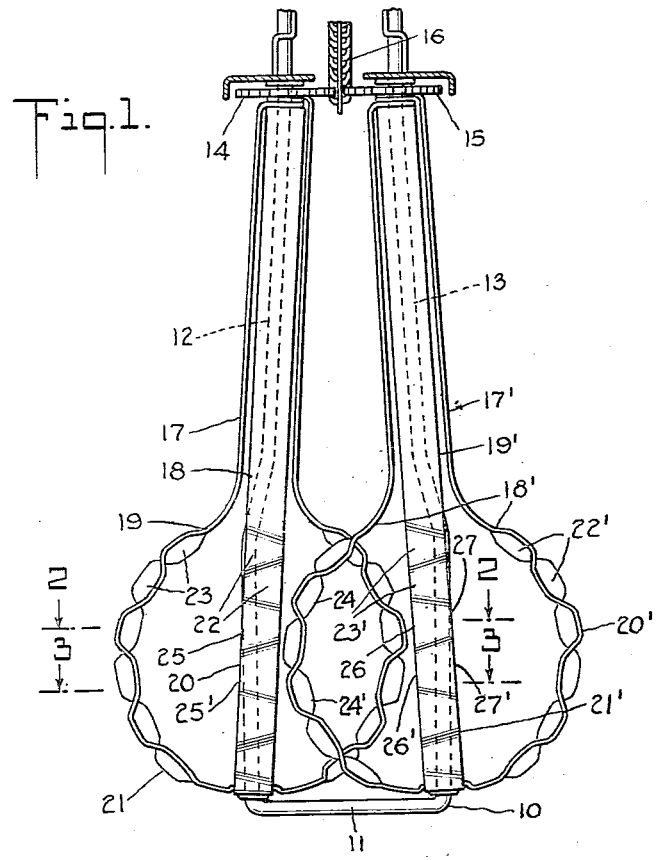
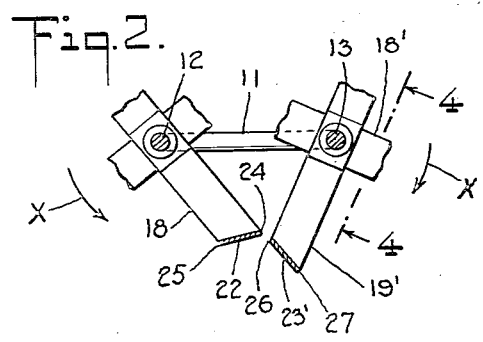
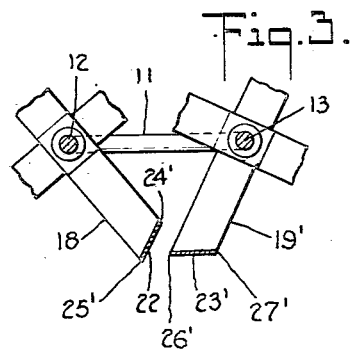
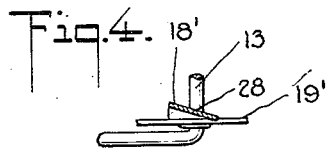
INVENTOR
STEPHEN ELLIS
BY
ATTORNEY

United States Patent Office 2,772,078
Patented Nov. 27, 1956

2,772,078

BEATER BLADES

Stephen Ellis, Newark, N. J., assignor of one-half to Adolph E. Ellis, Newark, N. J.

Application March 9, 1954, Serial No. 414,936

4 Claims. (Cl. 259—131)

This invention relates to beaters for use in the preparation of food and commonly referred to as egg beaters, as well as mixing apparatus employing beater blades. More particularly, the invention deals with the blade structure of devices of the kind under consideration. Still more particularly, the invention deals with the structure of the blade elements and the arrangement of the elements one with respect to the other in the pair of blades commonly employed in devices of the kind under consideration.

The novel feature of the invention will be best understood from the following description, when taken together with the accompanying drawing, in which certain embodiments of the invention are disclosed and, in which, the saparate parts are designated by suitable reference characters in each of the views and, in which:

Fig. 1 is a diagrammatic side view of the lower portion of a common type beater illustrating my improved blade construction.

Figs. 2 and 3 are diagrammatic sectional views on the line 2—2, 3—3 of Fig. 1 illustrating the blades in different positions from that shown in Fig. 1; part of the background showing in each figure being omitted for sake of clarity; and Fig. 4 is a sectional detailed view on the line 4—4 of Fig. 2.

In illustrating one adaptation and use of my invention, I have shown in Fig. 1 of the drawing the lower portion of a conventional type of egg beater, comprising an elongated frame 10 having a lower crosshead 11 and upwardly extending and slightly converging rods 12 and 13, to the upper ends of which are fixed pinions 14 and 15 which mesh with an intermediate drive wheel or gear 16, usually rotated by a hand crank, as with other devices of this type and kind. The detailed structures of the remainder of the beater are not shown, as they form no part of the present invention. As previously stated, the beater blade structure is adapted to any type or kind of beaters, whether manually or power driven and the present showing, as applied to a manually actuated egg beater, is simply by way of illustration.

Mounted on the rods 12 and 13 are two beater units 17, 17', each unit comprising two differently formed blades 18, 18'; 19, 19'. The blades 18, 18' are similarly formed; whereas, the blades 19, 19' are similarly formed, but these blades, in mounting the same on the rods 12, 13, are so arranged that the blade 18, for example, meets with the blade 19' as the blades are rotated in the direction of the arrows X of Fig. 2 of the drawing. The same arrangement of the blades 18 and 19' is also shown in Fig. 3 of the drawing, but at a different section through said blades. Each blade is in the form of a flat ribbon-like strip and is usually shaped to form a rounded beater end at the lower portion thereof, the rounded beater ends of the blades 18, 18' being indicated at 20, 20' and the rounded ends of the blades 19, 19' are shown at 21, 21'. Instead of leaving the strips of metal transversely straight in forming the rounded ends just referred to, these strips of metal are alternately bent to form alternately arranged and offset paddle portions 22, 22 on the blades 18, 18' and correspondingly offset paddle portions 23, 23' on the blades 19, 19'. However, the paddle portions of the blades 18, 18' are arranged oppositely to the alined paddle portions of the blades 19, 19'. This opposed relationship of the paddle portions is clearly illustrated in Figs. 2 and 3 of the drawing, which are diagrammatic showings simply of the cross-section through the paddle portions and omitting the background showing for sake of clarity.

It will, thus, be seen that, on the section line 2—2 taken through the blades 18, 19', the edge of the paddle portion 22, as at 24 extends outwardly with respect to the edge 25; whereas on the paddle portion 23, the edge 26 extends inwardly and the edge 27 extends outwardly. However, on the section line 3—3, which is the next adjacent paddle portion of each of the blades, the above mentioned condition is reversed. In other words, the edge 24' now extends inwardly; whereas, the edge 25' extends outwardly and the edge 26' extends outwardly; whereas, the edge 27' extends inwardly.

Considering Figs. 2 and 3 of the drawing, it will be understood that, in a normal beater blade construction, the portions of the blade, which are here identified as the paddle portions 22, 23, are normally at right angles to side edges of the blades, in other words, the edges, similar to the edges 24 and 25 as an example and what applicant has done is to offset the blades first inwardly and, then, outwardly so that, in travelling along the curved section of the blade, one paddle portion has the edge 24 extending outwardly with respect to the edge 25; whereas, adjacent paddle portions has the edge 24' extending inwardly and the edge 25' outwardly.

The paddle portions referred to result in a greater agitation of the mass operated upon by the beater and sets up a greater turbulence so as to more effectively and quickly produce the desired result, for example, in beating the whites of eggs to bring the egg white to the proper consistency, again, in whipping cream to its proper consistency and also in the mixing or beating of any type or kind of preparations. It will be understood that the action of the paddles tend to draw the material worked upon into the center of the blades, as well as to exert outwardly pressure of the material working in a direction opposed to that of another paddle. The paddle portions of the respective blades are located primarily on the curved portions 20, 20'; 21, 21. However, I provide, one one of the blades of each beater unit, for example, the blades 18, 18', a slight paddle portion 28, as noted on the blade 18' in Fig. 4 of the drawing. The purpose of this paddle portion is to assert a lifting force on material which is agitated or beaten by the beater, so as to prevent collection of unbeaten material at the lower portion of a container in which the blade is arranged.

For purposes of description, it may be simply said that the pair of beaters of a beater unit of the character described have two pairs of blades with a different arangement or different offsetting of paddles thereon, so united on the yoke-shaped beater frame defined by the crosshead 11 and rods 12 and 13 as to dispose intersecting different blades with their paddles arranged in opposed relationship to each other, in the manner which is clearly diagrammatically illustrated in Figs. 2 and 3 of the drawing. The use of the term "intersecting" is descriptive of the rounded portions of the blades coming into reasonably close proximity to each other, as the beater blade units are rotated, in other words, as the blades 18, 19' approach each other. In this connection, it will be understood that, in the diagrammatic showing of Fig. 1, the blades 18, 19' are shown in their flat relationship; whereas, the blades 19, 18' are shown in their edge relationship and, while the illustration of the paddles 22, 23; 22', 23' are diagrammatic, this is simply for sake of clarity to disclose the offsetting of the edge portions one with respect to the other.

Having fully described my invention, what I claim as new and desire to secure by Letters Patent is:

1. A beater of the character described, comprising a frame defined by a crosshead and a pair of converging rods, a beater unit rotatably mounted on each of said rods, each unit comprising a pair of blades, the blades of each unit having rounded ends adjacent the crosshead of said frame, the rounded ends of each blade having offset paddle portions, adjacent paddle portions of each blade being offset in opposed directions, and the paddle portions of one blade in each unit being offset in an opposed direction to corresponding horizontally alined paddle portions of the other blades of said units.

2. A beater of the character described, comprising a frame defined by a crosshead and a pair of converging rods, a beater unit rotatably mounted on each of said rods, each unit comprising a pair of blades, the blades of each unit having rounded ends adjacent the crosshead of said frame, the rounded ends of each blade having offset paddle portions, adjacent paddle portions of each blade being offset in opposed directions, the paddle portions of one blade in each unit being offset in an opposed direction to corresponding horizontally alined paddle portions of the other blades of said units, and the arrangement of the blades of said units being such as to bring opposed blades of said units toward each other in the operation of the beater.

3. A beater of the character described, comprising a frame defined by a crosshead and a pair of converging rods, a beater unit rotatably mounted on each of said rods, each unit comprising a pair of blades, the blades of each unit having rounded ends adjacent the crosshead of said frame, the rounded ends of each blade having offset paddle portions, adjacent paddle portions of each blade being offset in opposed directions, the paddle portions of one blade in each unit being offset in an opposed direction to coresponding horizontally alined paddle portions of the other blades of said units, the arrangement of the blades of said units being such as to bring opposed blades of said units toward each other in the operation of the beater, and the rounded portions of one blade of each unit, adjacent the crosshead of said frame, having blades creating a lifting function adjacent the crosshead of the frame in the operation of the beater.

4. A blade unit for beaters of the class described, comprising a pair of blades disposed substantially at right angles to each other, each blade having an enlarged beater end defined by opposed portions, each of the opposed portions of the enlarged beater end of each blade having longitudinally spaced offset paddle portions, adjacent paddle portions of each opposed portion being offset in opposed directions to each other, and the offset of the paddle portions of one enlarged beater end of the unit being offset in opposed directions to correspondingly alined paddle portions of the other enlarged beater end of said unit.

References Cited in the file of this patent
UNITED STATES PATENTS

| | | |
|---|---|---|
| 793,142 | Merrell | June 27, 1905 |
| 1,519,746 | Valerius | Dec. 16, 1924 |
| 1,710,417 | Goodell | Apr. 23, 1929 |
| 1,761,634 | Kuck | June 3, 1930 |
| 2,046,109 | Dunne et al. | June 30, 1936 |